(12) United States Patent
Chinta et al.

(10) Patent No.: US 11,232,104 B2
(45) Date of Patent: Jan. 25, 2022

(54) JOIN AND PREDICATE FILTERING USING STRING LENGTHS FOR VARIABLE CHARACTER FIELDS

(71) Applicant: International Business Machines Corporation, Armonk, NY (US)

(72) Inventors: Kiran Chinta, Hillsboro, OR (US); Christopher A. Drexelius, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 16/252,881

(22) Filed: Jan. 21, 2019

(65) Prior Publication Data
US 2020/0233868 A1 Jul. 23, 2020

(51) Int. Cl.
*G06F 16/2453* (2019.01)
*G06F 16/2458* (2019.01)
*G06F 16/22* (2019.01)

(52) U.S. Cl.
CPC .... *G06F 16/24544* (2019.01); *G06F 16/2282* (2019.01); *G06F 16/2458* (2019.01)

(58) Field of Classification Search
CPC .......... G06F 16/24544; G06F 16/2458; G06F 16/2282
USPC ...................................................... 707/714
See application file for complete search history.

(56) References Cited

U.S. PATENT DOCUMENTS

| | | | | |
|---|---|---|---|---|
| 2002/0069193 A1* | 6/2002 | Beavin | ............... | G06F 16/24537 |
| 2007/0276835 A1* | 11/2007 | Murthy | ............... | G06F 21/6227 |
| 2011/0302189 A1* | 12/2011 | Liu | ......... | G06F 16/835 |
| | | | | 707/769 |
| 2014/0304275 A1* | 10/2014 | Baskett | ............... | G06F 16/2255 |
| | | | | 707/747 |
| 2015/0088844 A1* | 3/2015 | Stigsen | .................. | G06F 16/22 |
| | | | | 707/703 |
| 2015/0269223 A1* | 9/2015 | Miranker | ................ | G06F 16/25 |
| | | | | 707/713 |
| 2015/0379119 A1* | 12/2015 | Chen | ................. | G06F 16/90344 |
| | | | | 707/713 |
| 2017/0031976 A1* | 2/2017 | Chavan | .................. | G06F 16/23 |
| 2017/0060973 A1* | 3/2017 | Liu | ....................... | G06F 16/215 |
| 2017/0109386 A1* | 4/2017 | Baer | ................ | G06F 16/24554 |
| 2017/0255675 A1 | 9/2017 | Chavan et al. | | |
| 2018/0075262 A1* | 3/2018 | Auh | ....................... | H04L 9/0637 |
| 2019/0005107 A1* | 1/2019 | Carey | ................... | G06F 16/221 |

OTHER PUBLICATIONS

"What is Equi Join in SQL"; retrieved from www.w3resource.com/sql/joins/perform-an-equi-join.php; Apr. 2018.
"Overview of Predicates", retrieved from https://docs.intersystems.com/latest/csp/docbook/DocBook.UI.Page.cls? KEY=RSQL_predicates; as early as 1997.

(Continued)

*Primary Examiner* — Giovanna B Colan
(74) *Attorney, Agent, or Firm* — Stephanie L. Carusillo

(57) ABSTRACT

A database containing filtering capabilities on VARCHAR columns for use with equality predicates and equi-join processing in column-organized tables. Every VARCHAR column within a database is associated with a hidden column in the same table that stores the respective string length.

5 Claims, 5 Drawing Sheets

(56) References Cited

OTHER PUBLICATIONS

"SQL Comparison operator"; retrieved from https://www.w3resource.com/sql/comparison-operators/sql-comparison-operators.php#EQUAL; Jul. 2018.
"HP NonStop SQL/MX Release 3.2.1 Programming Manual for C and COBOL" retrieved from http://nonstoptools.com/manuals/SqlMx-C-Cobol-Guide.pdf; Jun. 2013.
"String field value length in mongoDB" retrieved from https://stackoverflow.com/questions/29577713/string-field-value-length-in-mongodb/29578020; as early as Apr. 2015.
"Understanding Hash Joins" retrieved from https://docs.microsoft.com/en-us/previous-versions/sql/sql-server-2008-r2/ms189313(v=sql.105); Oct. 2012.
Barber et al. "Memory-Efficient Hash Joins" Proceedings of the VLDB Endowment vol. 8, No. 4. 2014.

\* cited by examiner

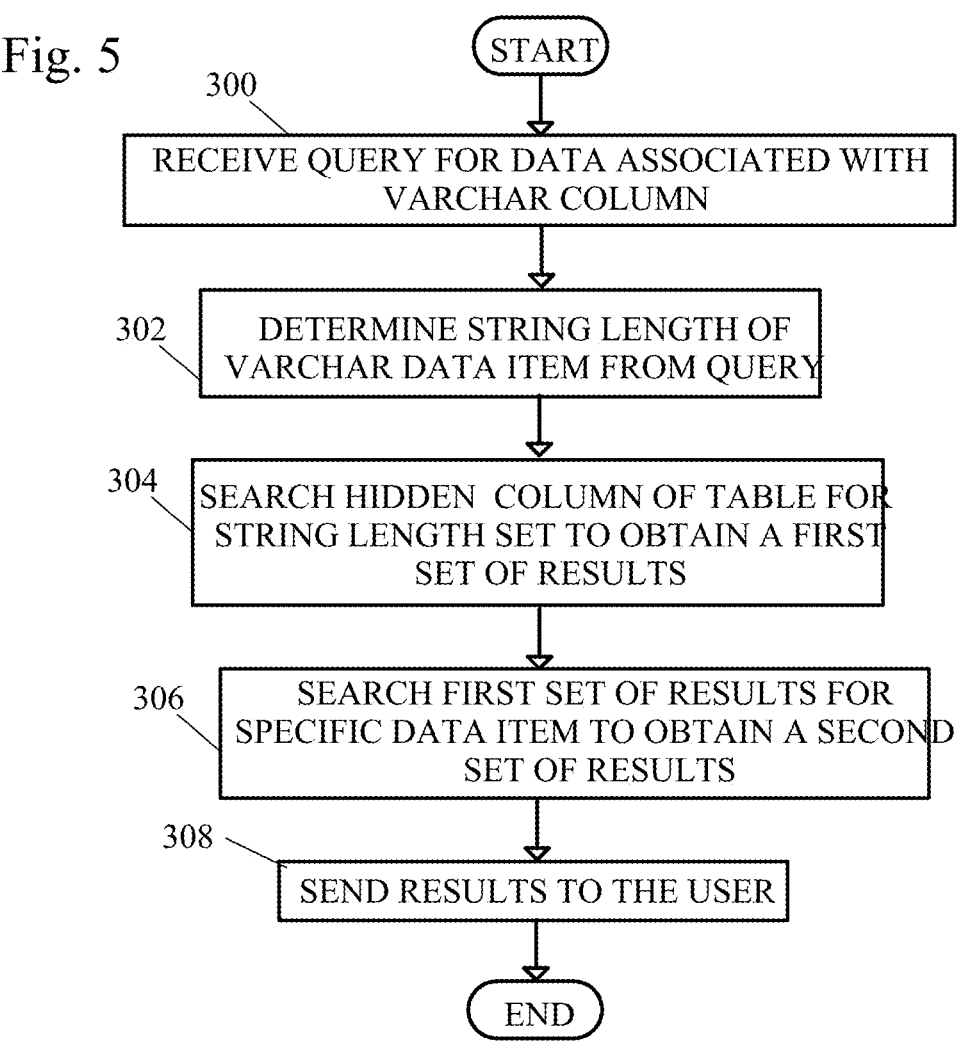

JOIN AND PREDICATE FILTERING USING STRING LENGTHS FOR VARIABLE CHARACTER FIELDS

BACKGROUND

The present invention relates to filtering, and more specifically to join and predicate filtering using string lengths for variable character fields (VARCHAR).

The term VARCHAR refers to a data type of a field (or column) in a database management system which can hold letters and numbers.

Operations such as applying predicates to VARCHAR columns and joining VARCHAR columns are expensive and often perform poorly. Due to the variable length nature of the VARCHAR columns and the data stored in that column, most often VARCHAR columns are defined at a much larger size than the actual data stored in that column. Some VARCHAR columns that don't contain data in a standard format are greatly oversized in order to hold almost any type of data.

An example of a VARCHAR column would be a column to store e-mails, which could be oversized at 320 characters, or even up to 1000 characters in some cases where the maximum length of an e-mail address is much less. For example, the RFC-3696 standard specifies that an e-mail address may not exceed 320 characters, but columns containing such data may be defined much larger by application developers not familiar with the standard.

Some database management systems (DBMS) concatenate the length and VARCHAR value, which enables some additional filtering optimizations. However, since the length and value are combined, the filtering still requires the VARCHAR value to at least be read.

SUMMARY

According to one embodiment of the present invention, a method of joining between a first table and a second table on a variable character field column with an associated hidden column containing string length data within a database is disclosed. The method comprising the steps of: receiving a query for data associated with the variable character field column of the join between the first table and the second table, the join designating at least the first table or the second table as an inner table and the other first table or second table as the outer table; the inner table of the join sending a minimum and maximum data representing a length value of data associated within the variable character field column from the hidden column associated with the variable character field column of the inner table to the outer table; the outer table of the join applying the minimum and maximum length to the hidden column in the outer table to obtain a first set of results; searching with the first set of results of the hidden column and associated with a variable character field column of the outer table, for data in the query to obtain a second set of results; and sending the second set of results to the user.

According to another embodiment of the present invention, a method of predicate filtering within a table comprising at least one variable character field column with an associated hidden column containing string length data within a database is disclosed. The method comprising the steps of: receiving a query for data associated with the variable character field column; determining a string length of the data associated with the variable character field column of the table; searching the hidden column for the determined string length to obtain a first set of results; searching with the first set of results for data of the query to obtain a second set of results; and returning the second set of results to the user.

According to another embodiment of the present invention, a computer program product for joining between a first table and a second table on a variable character field column with an associated hidden column containing string length data within a database is disclosed. The joining between the first table and the second table is executed by a computer comprising at least one processor, one or more memories, one or more computer readable storage media, the computer program product comprising a computer readable storage medium having program instructions embodied therewith. The program instructions executable by the computer to perform a method comprising: receiving, by the computer, a query for data associated with the variable character field column of the join between the first table and the second table, the join designating at least the first table or the second table as an inner table and the other first table or second table as the outer table; the inner table of the join sending, by the computer, a minimum and maximum data representing a length value of data associated within the variable character field column from the hidden column associated with the variable character field column of the inner table to the outer table; the outer table of the join applying, by the computer, the minimum and maximum length to the hidden column in the outer table to obtain a first set of results; searching, by the computer, with the first set of results of the hidden column and associated with a variable character field column of the outer table, for data in the query to obtain a second set of results; and sending, by the computer, the second set of results to the user.

According to another embodiment of the present invention, a computer program product for predicate filtering within a table comprising at least one variable character field column with an associated hidden column containing string length data within a database is disclosed. The database is accessible by a computer comprising at least one processor, one or more memories, one or more computer readable storage media, the computer program product comprising a computer readable storage medium having program instructions embodied therewith. The program instructions executable by the computer to perform a method comprising: receiving, by the computer, a query for data associated with the variable character field column; determining, by the computer, a string length of the data associated with the variable character field column of the table; searching, by the computer, the hidden column for the determined string length to obtain a first set of results; searching, by the computer, with the first set of results for data of the query to obtain a second set of results; and sending, by the computer, the second set of results to the user.

According to another embodiment of the present invention, a computer system for joining between a first table and a second table on a variable character field column with an associated hidden column containing string length data within a database is disclosed. The joining between the first table and the second table is executed by a computer comprising at least one processor, one or more memories, one or more computer readable storage media having program instructions executable by the computer to perform the program instructions. The program instructions comprising: receiving, by the computer, a query for data associated with the variable character field column of the join between the first table and the second table, the join designating at least the first table or the second table as an inner table and the other first table or second table as the outer table; the inner table of the join sending, by the computer, a minimum and maximum data representing a length value of data associated within the variable character field column from the hidden column associated with the variable character field column of the inner table to the outer table; the outer table of the join applying, by the computer, the minimum and maximum length to the hidden column in the outer table to obtain a first set of results; searching, by the computer, with the first set of results of the hidden column and associated with a variable character field column of the outer table, for data in the query to obtain a second set of results; and sending, by the computer, the second set of results to the user.

According to another embodiment of the present invention, a computer system for predicate filtering within a table comprising at least one variable character field column with an associated hidden column containing string length data within a database is disclosed. The database is accessible by a computer comprising at least one processor, one or more memories, one or more computer readable storage media having program instructions executable by the computer to perform the program instructions. The program instructions comprising receiving, by the computer, a query for data associated with the variable character field column; determining, by the computer, a string length of the data associated with the variable character field column of the table; searching, by the computer, the hidden column for the determined string length to obtain a first set of results; searching, by the computer, with the first set of results for data of the query to obtain a second set of results; and sending, by the computer, the second set of results to the user.

BRIEF DESCRIPTION OF THE SEVERAL VIEWS OF THE DRAWINGS

FIG. 5 shows a flow diagram of a method of predicate filtering using string lengths for VARCHAR columns.

DETAILED DESCRIPTION

Figure 1:
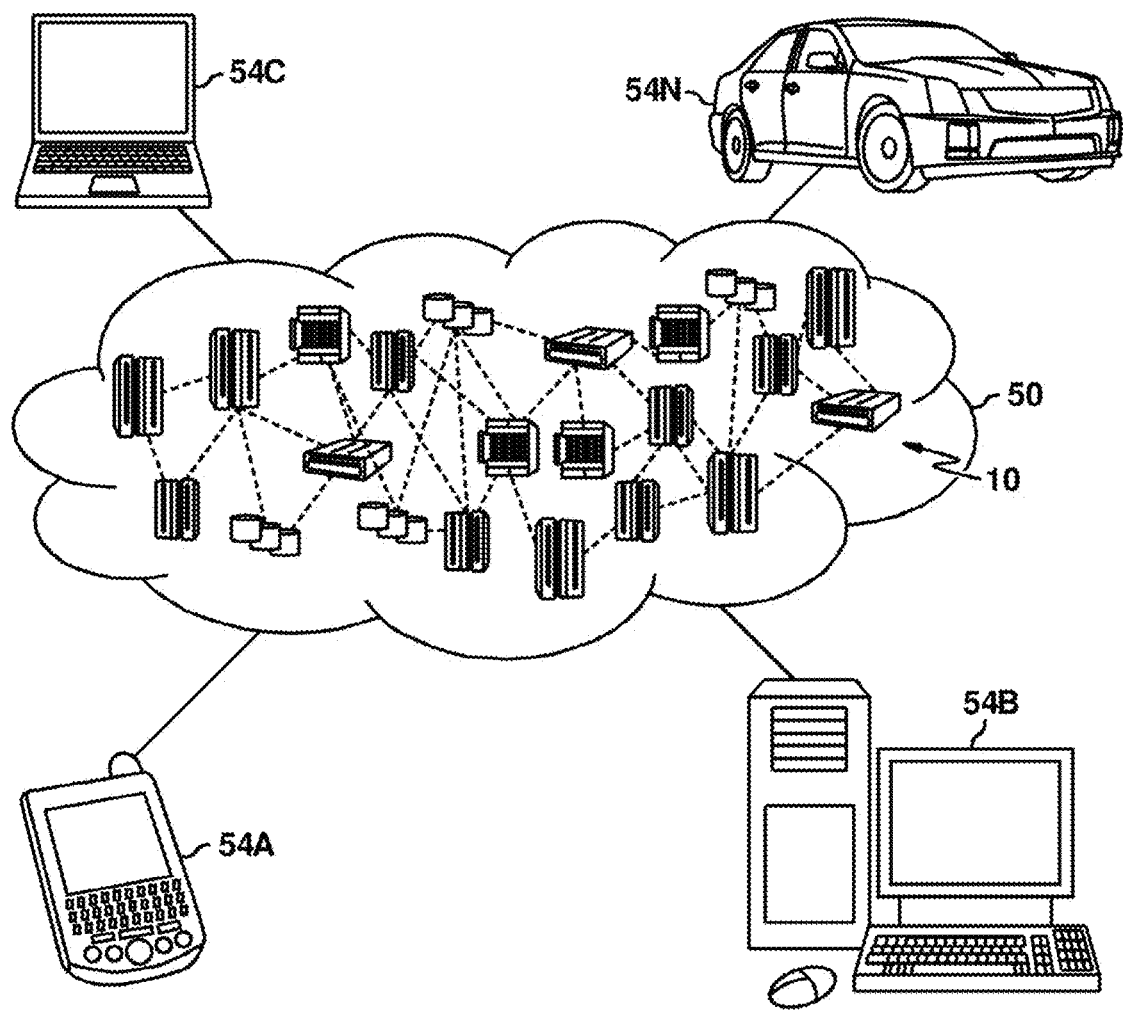
FIG. 1 depicts a cloud computing node according to an embodiment of the present invention.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
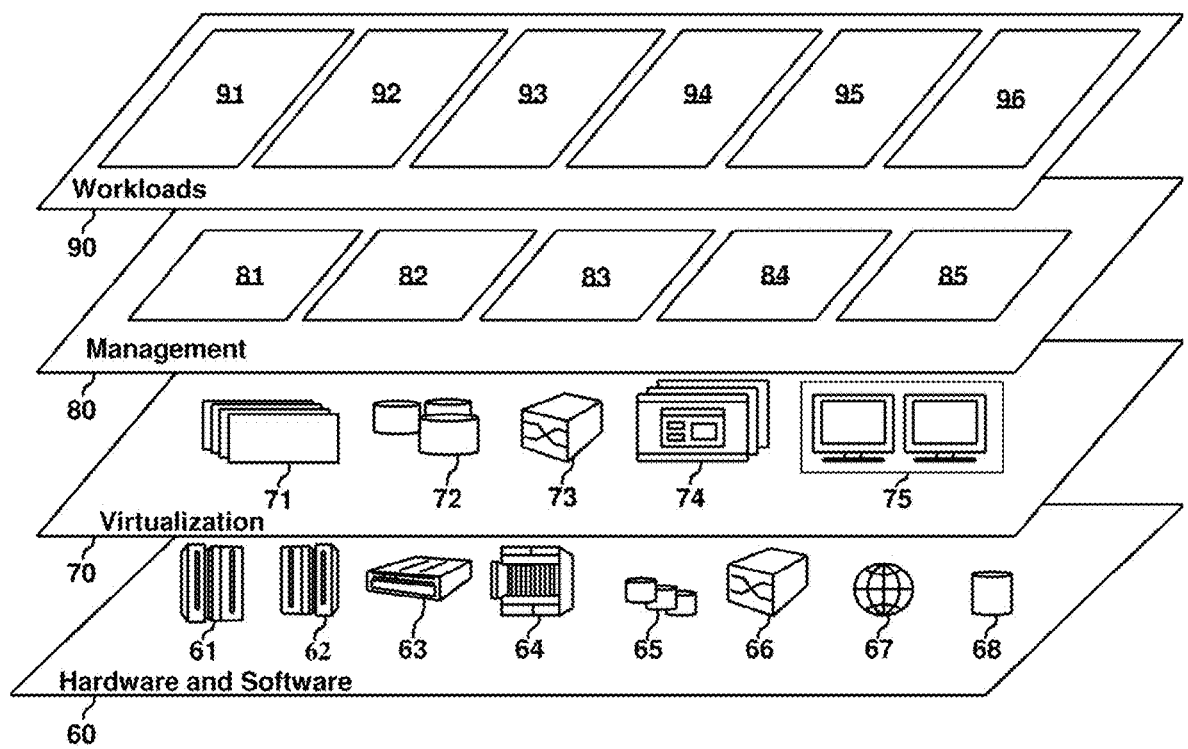
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In one embodiment of the present invention, the database software 68 includes clustered databases or other large scale databases.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and filter processing 96 of data.

In an embodiment of the present invention, filtering on VARCHAR columns is added to a database management system to reduce the costs and allow for equality predicates and equi-join processing in column-organized tables. Equality predicates are a condition expression that evaluates to a Boolean value, either true or false and contains equality comparison conditions such as equals, does not equals, greater than, less than, greater than or equal to, less than or equal to. An equi-join is a join with a join condition containing an equality operator. The join is performed against equality or matching column(s) values of the associated tables. An equijoin returns only the rows that have equivalent values for the specified columns. Every VARCHAR column within a database is associated with a hidden column in the same table that stores the respective string length.

Within the column-organized tables of the database, each VARCHAR column is associated with a hidden column in the same tables that store the respective string length. Accessing the hidden column containing data representing a length of a string of VARCHAR data in a column store does not require the VARCHAR data to be accessed. The hidden column may be populated as data is inserted or via a sync background process after data is committed. A flag may be used to indicate when this hidden column is populated.

During predicate filtering or joins, the metadata present in the hidden column is used to apply inexpensive and early filtering of tuples that do not qualify for the operation being performed. The filtering uses actual data lengths rather than the column length for columns usage estimates.

After the early filtering is completed, the qualifying subset of tuples is used for string comparisons. The filtering uses actual data lengths rather than the column length for columns usage estimates.

Predicates are generated on minimum and maximum lengths from the inner table's hidden column. From the predicates generated, filtering can occur to remove the non-qualifying tuples using the outer table's hidden column before loading the VARCHAR column pages. This also reduces the number of string comparisons being formed.

For equality predicates, an extra predicate and filter using the hidden column is generated prior to the string comparison. The optimizer generates estimates for VARCHAR columns using the defined column size at the time of table creation. Alternatively, the hidden length column may be used instead since the hidden length column provides actual size information.

Similar estimation techniques are possible within runtime, for example for memory consumption. In other words, hidden columns associated with a VARCHAR column can be specific to memory consumption enabling estimates to be prepared. For example, if a system had 1 MB of memory for use and a VARCHAR column size of 1 KB, conventionally, the size of the VARCHAR column would be designated as holding no more than 1000 VARCHAR values in the 1 MB of memory. However, the VARCHAR column may not contain that many characters (e.g. each VARCHAR column had no more than 10 characters each). Using the hidden column of an embodiment of the present invention, an accurate estimate can be made and with a VARCHAR column which only had values that were no more than 10 characters each, in the 1 MB of memory, 100,000 VARCHAR values could be stored in memory. Therefore, using the conventional methods of set VARCHAR column size, the number of values that can be stored in memory would be greatly underestimated, which can limit performance of the computer system or the computer itself.

In another embodiment of the present invention, a new database structure is disclosed. The database structure includes a plurality of tables, in which at least one table includes rows (tuples) and columns each with associated metadata. For each column in the table that includes VARCHAR data or is designated to include VARCHAR data, a corresponding hidden column is added or present within the same table that includes associated data representing a length of a string of VARCHAR data in the VARCHAR data column. The hidden column may be populated as data is inserted or via a sync background process after data is committed. A flag may be used to indicate when this hidden column is populated. The new database structure saves disk space by eliminating redundant data, maintains data accuracy and integrity. Furthermore, the addition of the hidden column associated with VARCHAR data of the table in the database structure increases the speed at which queries can be executed, decreases the cost associated with executing such queries, and decreases the computer resources required to execute the query, thereby improving the computer system.

Usecase 1—Join Between Two Tables on a Column with String Data Type

Consider the following two tables—Table 1 and Table 2 below each with a million rows.

TABLE 1

| Customer1 | | | |
|---|---|---|---|
| custID - c1 | emailID | Hidden emailID length | ... |
| 123456 | Kitty123@1234.com | 18 | ... |
| 789011 | Bark456@5678.com | 16 | ... |
| 136799 | Paperclip2@10111.com | 20 | ... |
| 791244 | Littlekitty1995@10111.com | 27 | ... |
| ... | ... | ... | ... |

TABLE 2

| Customer2 | | | |
|---|---|---|---|
| custID -c2 | emailID | Hidden emailID length | ... |
| 791244 | Littlekitty1995@10111.com | 27 | ... |
| 013451 | Minniemouse9234@1234.com | 25 | ... |
| 106799 | coffeecupfull1234@1234.com | 27 | ... |
| 654321 | Moviecritic98@91919.com | 19 | ... |
| ... | ... | ... | ... |

The custID column is of an integer type and the emailID is of the VARCHAR data type. The emailID is used to represent the column with e-mail addresses. While the VARCHAR column is set to 320 characters for this example.

If the two tables, Table 1 and Table 2 were to be equi-joined on a column with string data type using a hash join and a query of the following is received from the user:
 "select*from customer1 c1, customer2 c2 where c1.emailid=c2.emailID"
The inner table will send the min length and the max length from the hidden column for the join key to the outer table. The outer table then applies the min and max lengths on the hidden column for the foreign-key to filter the qualifying VARCHAR tuples first (e.g. e-mail addresses in this example). For example, if Table 1 was the outer table and Table 2 was the inner table, the min and max lengths from the hidden column would be sent from the inner table to the outer table. Based on the data shown above in Table 2, the minimum is 19 and the maximum is 27. The equi-join of Table 1 and Table 2 would filter out e-mail addresses in the outer table that are less than 19 and more than 27 in length.

With this, the respective VARCHAR tuples of the qualifying length tuples undergo string comparisons. In a distributed cluster, this early filtering alleviates broadcasting the non-qualifying tuples to other nodes in the cluster.

Based on the above query, the emailID of littlekitty1995@10111.com would be returned to the user.

In the above example, conventionally, the join key of one table would be compared against the join key of the other table and a resulting set would be returned to the user.

UseCase 2—Predicate Filtering

A query of the following was received from the user and applied to Tables 1 and 2 above in the usecase:
 "select*from customer1 where emailID=Bark456@5678.com"
Using a method of an embodiment of the present invention, the string length of the emailID being searched for is determined, and the query which is then applied to Table 1 is:
 "select*from customer1 where emailID=bark456@567.com" and "hiddenemailIDLength=16"
By searching for the string length to obtain results and then searching for the specific emailID, the search is faster and more efficient decreasing the resources required to execute the search in the large database.

In the above example, conventionally, the emailID being searched for is compared to all other emailIDs in each table one after the other which has a high cost in query performance.

UseCase 3—Estimation for Optimizer and Runtime Processing

The hidden column containing the respective string lengths can be generated at the time of data insertion or an asynchronous background job that starts after the insert is committed and inserts the respective string length. Once the hidden column contains all of the string lengths inserted, queries can use this information to increase performance.

Conventionally for columns of variable length, the optimizer estimates the size based on the max length defined for the column. For a column with varchar(1024), the optimizer would model the cost and plan based on 1024 characters even through in reality the maximum length of the data in that column is in the order of 10's of characters. The same estimation techniques are used for runtime for cases where varchar values are materialized in memory, and the amount of memory that will be consumed during a process is based on the maximum length of the data in that column.

Example—Implementation of UseCase 2

An example of the performance improvement for usecase 2 using the method of an embodiment of the present invention is shown below.

A Db2 LUW 11.1.1 column-oriented table containing 188 million rows containing e-mail addresses was populated by load. The table consisted of one varchar(320) column and a hidden length column. The varchar column had e-mail addresses with lengths ranging between 12 and 56 bytes. A simulation using this table was run with the VARCHAR values being fully compressed as well as uncompressed. The hidden length column was always compressed. An equality predicate was run with and without the extra length predicate.

The queries used were:
"Select count(*) from t1 where e-mail=littlekitty1995@10111.com" and
"Select count(*) from t1 where length=27 and email=littlekitty1995@10111.com"

The test used cold bufferpools to highlight the amount of data accessed. To eliminate noise from any other related Db2 features that may not be common in other tables, columnar prefetching support was disabled.

Run on compressed data:

```
time db2 "select count(*) from t1Compressed where
email='littlekitty1995@10111.com'"
1
---------------------
500000
1 record(s) selected.
real 0m11.893s
user 0m0.016s
sys 0m0.028s
time db2 "select count(*) form t1Compressed where length = 27 and
email='littlekitty1995@10111.com'"
1
---------------------
500000
1 record(s) selected.
real 0m8.481s
user 0m0.012s
sys 0m0.036s
```

Run on compressed data

```
time db2 "select count(*) from t1Uncompressed where
email='littlekitty1995@10111.com'"
1
---------------------
500000
1 record(s) selected.
real 3m19.069s
user 0m0.008s
sys 0m0.048s
time db2 "select count(*) form t1Uncompressed where length = 27 and
email='littlekitty1995@10111.com'"
1
---------------------
500000
1 record(s) selected.
real 2m31.439s
user 0m0.008s
sys 0m0.032s
```

For compressed varchar data, adding the length predicate provided a 28% improvement in performance (e.g. 11.893 s without length predicate versus 8.481 s with the length predicate) and for uncompressed varchar data, adding the length predicate provided a 24% improvement in performance (e.g. 3 m 19.069 s without length predicate versus 2 m 31.439 s with the length predicate).

Figure 3:
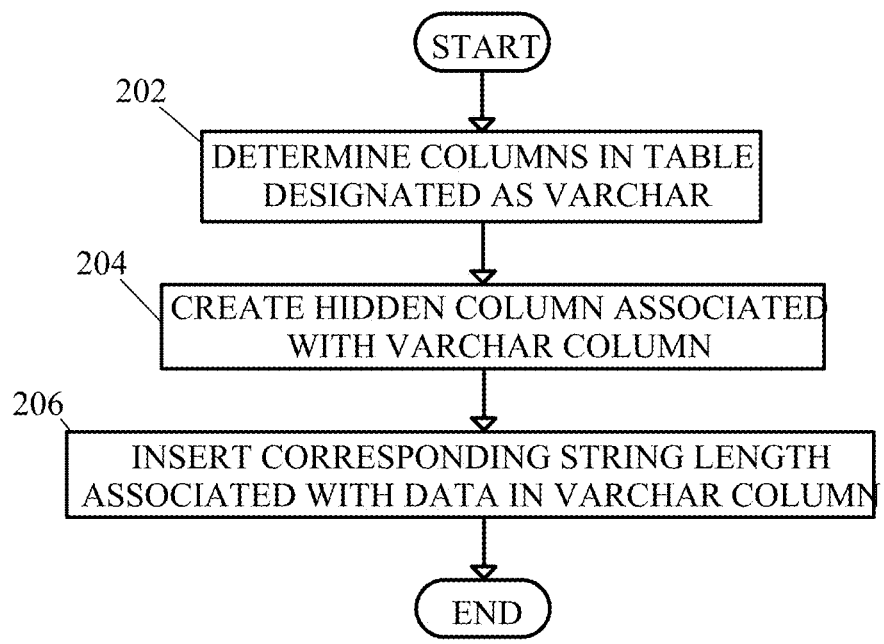
FIG. 3 shows a flow diagram of a method adding a hidden column with string length associated with a VARCHAR column.

FIG. 3 shows a flow diagram of a method adding a hidden column with string length associated with a VARCHAR column.

In a first step, columns of a table of a database designated as variable character fields (VARCHAR) are determined (step 202).

Next, a hidden column is created and associated with each VARCHAR column of the table in the database (step 204). A corresponding string length associated with each entry of data in the VARCHAR column is inserted into the hidden column (step 206) and the method ends.

As entries are continually made in the VARCHAR column of the table, additionally entries with corresponding data can be added to the hidden column with the associated string length.

Figure 4:
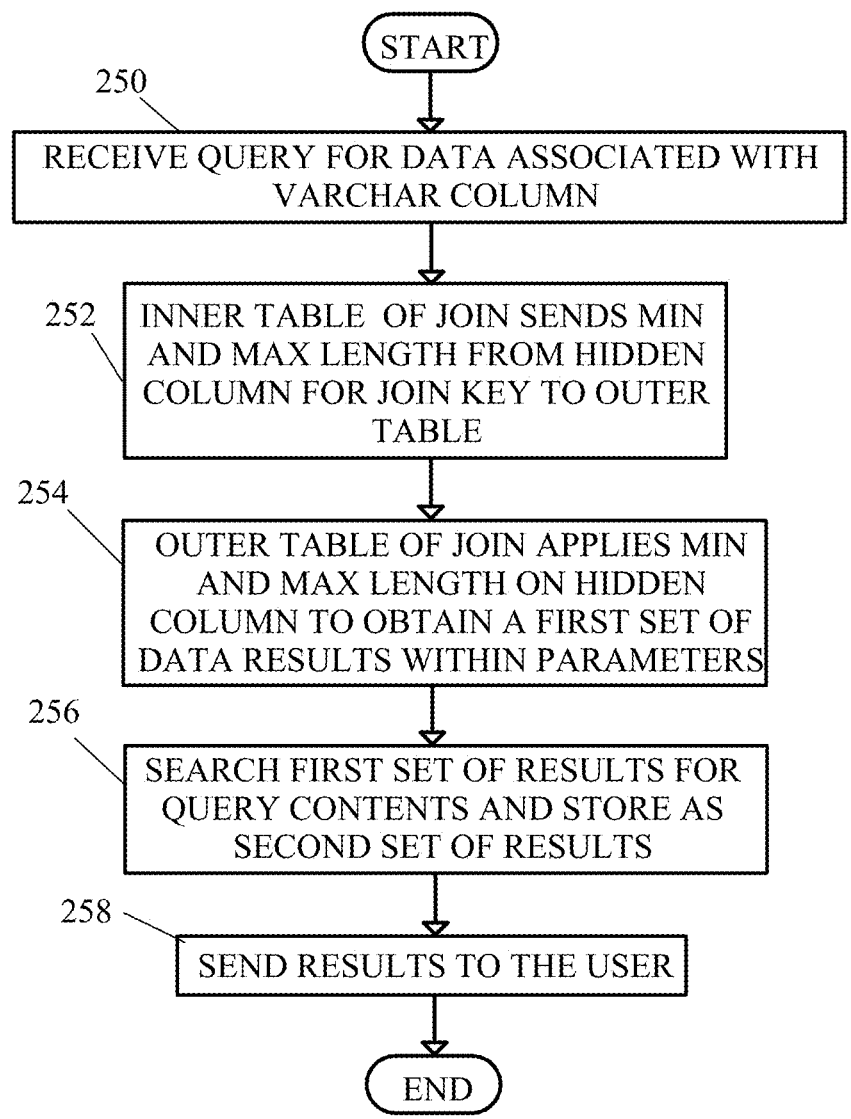
FIG. 4 shows a flow diagram of a method of joining two tables on column with string data.

FIG. 4 shows a flow diagram of a method of joining two tables on column with string data. It should be noted that FIG. 3 takes place after the hidden column has been created.

In a first step, a query for data associated with the VARCHAR column of a table in a database (step 250) is received. In one embodiment, the query includes data associated with the variable character field column of the join between the first table and the second table including the designation of which table is the inner table and the outer table.

The inner table of the join sends min and max string lengths parameters from the hidden column for the join key to the outer table (step 252). The outer table of the join applies the min and max string lengths parameters received to the hidden column of the outer table to obtain a first set of data results within the parameters (step 254). The first set of data results from step 254, based on the applied min and max, are searched for the query contents to obtain a second set of results which are stored (step 256). The second set of results are sent to the user (step 258) and the method ends.

FIG. 5 shows a flow diagram of a method of predicate filtering using string lengths for VARCHAR columns. It should be noted that FIG. 3 takes place after the hidden column has been created.

In a first step, a query for data items(s) associated with the VARCHAR column of a table in a database (step 300) is received.

A string length of the data item(s) of the query is determined (step 302).

The hidden column of the table is searched for the determined string length to obtain a first set of results (step 304).

The first set of results are searched for the specific data item of the query to obtain a second set of results (step 306) and the second set of results are sent to the user (step 308) and the method ends.

In the above embodiments, the addition of the hidden column associated with VARCHAR data of the table increases the speed at which queries can be executed, decreases the cost associated with executing such queries, and decreases the computer resources required to execute the query, thereby improving the computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of predicate filtering within a database comprising the steps of:
   receiving a query for variable character (VARCHAR) data from a table comprising a VARCHAR field column with a corresponding hidden column containing string length data for respective VARCHAR data within the VARCHAR field column;
   determining a string length of the VARCHAR data;
   searching the corresponding hidden column for the string length to obtain a first set of results;
   searching the first set of results for the VARCHAR data to obtain a second set of results; and
   returning the second set of results to the user.

2. The method of claim 1, wherein the hidden column is added to the first table and the second table by the steps comprising:
   determining at least one column within the table of the database designated as a variable character field column;
   creating a hidden column associated with the variable character field column; and
   inserting corresponding string length associated with each entry in the variable character field column.

3. The method of claim 2, wherein the insertion of the corresponding string length associated with each entry in the variable character field column is populated as data is inserted into the variable character field column.

4. The method of claim 3, wherein a flag indicates when the hidden column is populated with data corresponding to the string length associated with each entry in the variable character field column.

5. The method of claim 2, wherein the insertion of the corresponding string length associated with each entry in the variable character field column is populated after data is committed to the variable character field column.

* * * * *